United States Patent
Dent

(10) Patent No.: US 6,359,874 B1
(45) Date of Patent: Mar. 19, 2002

(54) PARTIALLY BLOCK-INTERLEAVED CDMA CODING AND DECODING

(75) Inventor: Paul W. Dent, Pittsboro, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/082,722

(22) Filed: May 21, 1998

(51) Int. Cl.$^7$ .............................................. H04B 7/216
(52) U.S. Cl. ...................................... 370/342; 375/130
(58) Field of Search ................................ 370/342, 335, 370/320, 318, 333, 432, 441, 203, 209, 210, 212; 375/130, 135, 140, 146

(56) References Cited

U.S. PATENT DOCUMENTS

| | | | |
|---|---|---|---|
| 4,568,915 A | | 2/1986 | Gutleber ...................... 341/81 |
| 5,550,809 A | | 8/1996 | Bottomley et al. .......... 370/342 |
| 5,555,257 A | | 9/1996 | Dent ........................... 370/319 |
| 5,566,168 A | | 10/1996 | Dent ........................... 370/323 |
| 5,579,306 A | | 11/1996 | Dent ........................... 370/330 |
| 5,581,575 A | * | 12/1996 | Zehavi et al. ................ 375/142 |
| 5,594,941 A | | 1/1997 | Dent ........................... 455/13.4 |
| 5,619,503 A | | 4/1997 | Dent ........................... 370/330 |
| 5,631,898 A | | 5/1997 | Dent ........................... 370/203 |
| 5,751,761 A | | 5/1998 | Gilhousen ................... 375/146 |
| 6,005,852 A | * | 12/1999 | Kokko et al. ............... 370/329 |
| 6,101,168 A | * | 8/2000 | Chen et al. .................. 370/228 |
| 6,111,865 A | * | 8/2000 | Butler et al. ................. 370/335 |
| 6,125,136 A | * | 9/2000 | Jones et al. .................. 375/147 |
| 6,130,884 A | * | 10/2000 | Sato ............................ 370/335 |

* cited by examiner

Primary Examiner—Douglas Olms
Assistant Examiner—Phirin Sam
(74) Attorney, Agent, or Firm—Coats & Bennett, P.L.L.C.

(57) ABSTRACT

The present invention discloses a CDMA coding method including the steps of converting the information to be transmitted into digital form, error-correction coding the digital information, and assembling the coded symbols into frames having N symbols. Each coded information symbol within a frame is then repeated a first number of times L1 in succession and the sign of select repeated symbols, determined by a spreading code generator, is changed to produce a symbol block of N×L1 symbols. The symbol block is then repeated a second umber of times L2, where for each block repeat, a block sign change is applied to all symbols of the same block; the sign for each block may also be supplied by the spreading code generator. The resulting L2×N×L1 coded and repeated symbols are then modulated upon a radio frequency carrier and transmitted to a receiver simultaneously with similar symbols intended for other receivers, where different information is transmitted to a plurality of receivers. Signals coded for simultaneous transmission to different receivers may include a greater number of information symbols repeated a reduced number L1 times or a lesser number of information symbols repeated a greater number L1 times, while still maintaining the same number of repeated symbols in a block. By assigning specific block-spreading sequences to groups of signals in various adjacent service areas or according to transmitter-receiver distance, strong signals can be better discriminated from weak signals and inter-cell interference can be reduced.

32 Claims, 10 Drawing Sheets

BLOCK SPREADING USING FOURIER SEQUENCES FOR ORTHOGONAL SPREADING WHEN L2 IS NOT A POWER OF 2

THREE BLOCK REPEATS FOR A FIRST SIGNAL TRANSMISSION

| S1 S2 S3 S4 S5 ..... S$_N$ | S1 S2 S3 S4 S5 ..... S$_N$ | S1 S2 S3 S4 S5 ..... S$_N$ |

THREE BLOCK REPEATS FOR A SECOND SIGNAL TRANSMISSION USING BLOCK MULTIPLIERS 1, α, β
WHERE α = EXP(j2π/3) AND β = α$^2$

| S1 S2 S3 S4 S5 ..... S$_N$ | αS1 αS2 αS3 αS4 αS5 ..... αS$_N$ | βS1 βS2 βS3 βS4 βS5 ..... βS$_N$ |

THREE BLOCK REPEATS FOR A THIRD SIGNAL TRANSMISSION USING BLOCK MULTIPLIERS 1, β, α

| S1 S2 S3 S4 S5 ..... S$_N$ | βS1 βS2 βS3 βS4 βS5 ..... βS$_N$ | αS1 αS2 αS3 αS4 αS5 ..... αS$_N$ |

SET OF 3 FOURIER CODES USED:

$$\begin{bmatrix} 1 & 1 & 1 \\ 1 & \exp(j\,120°) & \exp(j\,240°) \\ 1 & \exp(j\,240°) & \exp(j\,120°) \end{bmatrix}$$

*FIG. 2*

PARTIALLY BLOCK-INTERLEAVED CDMA CODING AND DECODING

RELATED APPLICATION

This application is related to U. S. patent application Ser. No.09/707,590 of Dent, filed Nov. 7, 2000, a continuation of application Ser. No. 08/898,392, filed Jul. 22, 1997 and entitled "Communication System and Method with Orthogonal Block Encoding", which is incorporated herein by reference.

BACKGROUND

The present invention relates generally to radio communications, and more particularly to a method for communicating between multiple stations in a radio communications system using Code Division Multiple Access (CDMA).

Conventional CDMA techniques typically involve the steps of converting information to be transmitted to digital form, coding the digital information with error correction information, and interleaving coded blocks of information to obtain frames or blocks of symbols. Each symbol is then repeated a number of times and the signs of selected symbols are changed according to an orthogonal code pattern. In conventional systems, groups of the same repeated symbol were transmitted adjacent to each other. When propagation comprised multiple paths with relatively delayed propagation times, conventional CDMA signals were received with impaired orthogonality between signals using different orthogonal codes, since one orthogonal code is no longer orthogonal to another code unless they are time-aligned.

In conventional systems, the use of orthogonal Fourier sequences instead of binary orthogonal codes would have been tantamount to transmitting information on different frequencies, i.e., Frequency Division Multiple Access (FDMA). On the other hand, when practicing the invention set forth in the related application, in which single symbols are not repeated adjacent to one another but rather blocks of symbols are block-repeated, the use of Fourier sequences to vary the phase of each block repeat is not equivalent to FDMA and represents a new form of orthogonal coding, the orthogonality of which is less affected by multipath propagation.

Conventional systems often use frequency or timeslot re-use plans to allow transmitters covering adjacent service areas to share frequency spectrum or time without overlapping. For example, in the following U.S. patents, which are assigned to the present assignee and hereby incorporated by reference, both frequency and time re-use patterns and hybrids thereof are described:

| | |
|---|---|
| 5,631,898 | Cellular/Satellite Communications System with Improved Frequency Re-use; |
| 5,619,503 | Cellular/Satellite Communications System with Improved Frequency Re-use; |
| 5,594,941 | a Cellular/Satellite Communications System with Generation of a Plurality of Sets of Intersecting Antenna Beams; |
| 5,579,306 | Time and Frequency Slot Allocation System and Method; |
| 5,566,168 | TDMA/FDMA/CDMA Hybrid Radio Access Methods; and |
| 5,555,257 | Cellular/Satellite Communications System with Improved Frequency Re-use. |

The comparable notion of code re-use in CDMA systems has, however, not been implemented commercially. Traditionally, orthogonal codes transmitted from different base stations would be received relatively delayed at a receiver, and therefore no longer orthogonal. Thus, the use of code re-use patterns to control interference levels would have been ineffective. The present invention seeks to overcome the above deficiencies in the art by providing a method which maintains orthogonality to thereby allow for the use of code re-use patterns.

SUMMARY

In an exemplary embodiment of the present invention, a coding method comprises the step of converting information to be transmitted into digital form through the use of, for example, an analog-to-digital converter. The digital information is then error-correction coded using, for example, convolutional coding, block-coding or Reed-Solomon coding in order to improve error tolerance. The coded symbols are then assembled into frames containing N symbols for transmission.

Each coded information symbol within a frame is then repeated a first number of times L1 in succession and the sign of select repeated symbols, determined by a spreading code generator, is changed to produce a symbol block of N×L1 symbols. The symbol block is then repeated a second number of times L2, wherein for each block repeat, a block sign change is applied to all symbols of the same block; the sign for each block may also be supplied by the spreading code generator. The resulting L2×N×L1 coded and repeated symbols are then modulated upon a radio frequency carrier and transmitted to a receiver simultaneously with similar symbols intended for other receivers, whereby different information is transmitted to a plurality of receivers. Signals coded for simultaneous transmission to different receivers may comprise a greater number of information symbols repeated a reduced number L1 times or a lesser number of information symbols repeated a greater number L1 times, while still maintaining the same number of repeated symbols in a block.

A receiver for decoding information according to the present invention comprises means for receiving a composite radio signal bearing information for a plurality of receivers and means for converting the composite radio signal to a stream of representative numerical samples and storing the samples in memory during at least one information transmission frame. The stored samples are then compressed in number by a factor L2 by combining corresponding samples from each of the L2 block repeats, using additive or subtractive combinations according to the signs supplied by a local spreading code generator. As a result, the wanted signal components of the samples combine constructively while a high proportion of unwanted signal components cancel.

The compressed samples are then further compressed by a factor L1 by combining samples within the compressed block that correspond to repeated symbols and using another sign pattern from the local spreading code generator to affect additive or subtractive combining such that wanted signal components are enhanced relative to unwanted signal components. The signal samples, now doubly compressed by a factor L1×L2, are then error-correction decoded using, for example, a convolutional decoder or Reed-Solomon decoder in order to reproduce the transmitted digital information symbols.

The information symbols may then be digital-to-analog converted, if necessary, to reproduce an analog information signal, such as a voice signal.

In one preferred embodiment, the number of block repeats L2 is two. A first group of information signals to be transmitted from a transmitter to respective receivers located within a first service area is coded using block repeat signs ++ while a second group of information signals is coded using block repeat signs +−. The first group of information signals are, for example, intended for receivers situated at greater distances from the transmitter than the receivers for the second group of information signals.

A second transmitter for transmitting signals to receivers in a second service area, bordering or partially overlapping the first coverage area, codes information for transmission similarly, but the block repeat signs may be reversed (i.e., using sign pattern ++ for transmitting to the more nearby receivers and +− for transmitting to the more distant receivers). In this way, signals, which are transmitted at high power and therefore intended for distant receivers in one service area, suffer reduced interference from signals transmitted at high power in an adjacent service area. Also, signals transmitted at low power to nearby receivers suffer less interference from strong signals transmitted in the same coverage area to distant receivers.

In a second embodiment of the invention, the L2 block sign changes are replaced by L2 block phase changes. The L2 repeated blocks are transmitted with a phase rotation for each block of 0, Phi, 2 Phi, 3 Phi, . . . , L2 Phi where Phi is a block phase increment of zero or an integral multiple of 2Pi/L2.

The receiver for the phase-rotated repeat blocks combines L2 corresponding samples from each of the repeated blocks by first derotating the phase of a sample by its known block phase rotation to align the L2 samples in phase before adding them.

In a third embodiment, L2 is equal to 3 and Phi is zero degrees for a first group of signals, 120 degrees for a second group of signals, and 240 degrees for a third group of signals. The service area covered by a first transmitter is divided into sectors. The first group of signals are transmitted to the most distant receivers, the second group are transmitted to receivers at an intermediate distance, and the third group of signals are transmitted to the nearest receivers.

The assignment of a block repeat phase according to receiver distance is then permuted in adjacent service areas covered by other transmitters to form a 3-cell code re-use pattern, analogous to a frequency re-use pattern used in conventional cellular radio telephone systems.

BRIEF DESCRIPTION OF THE DRAWINGS

The above objects and features of the present invention will be more apparent from the following description of the preferred embodiments with reference to the accompanying drawings, wherein:

FIG. 2 illustrates an exemplary block spreading technique using Fourier sequences for orthogonal spreading according to the present invention;

DETAILED DESCRIPTION

The Dent application 09/707,590 teaches transmitting the "chips" of a CDMA coded transmission in an interleaved order, such that different signals transmitted using different orthogonal codes remain substantially orthogonal (i.e., non-interfering) to one another even in the presence of multipath propagation which causes delayed echoes of the signal to be received.

In an exemplary embodiment of the present invention, a limited amount of chip interleaving is used to provide a limited ability to discriminate between orthogonal signals. In particular, the ability to discriminate between a small number of groups of signals is provided by interleaving a corresponding number of chips representing the same coded information. The ability to discriminate further to isolate a single signal within a discriminated group is provided by conventional, non-interleaved CDMA coding in combination with error-correction coding.

Figure 1:
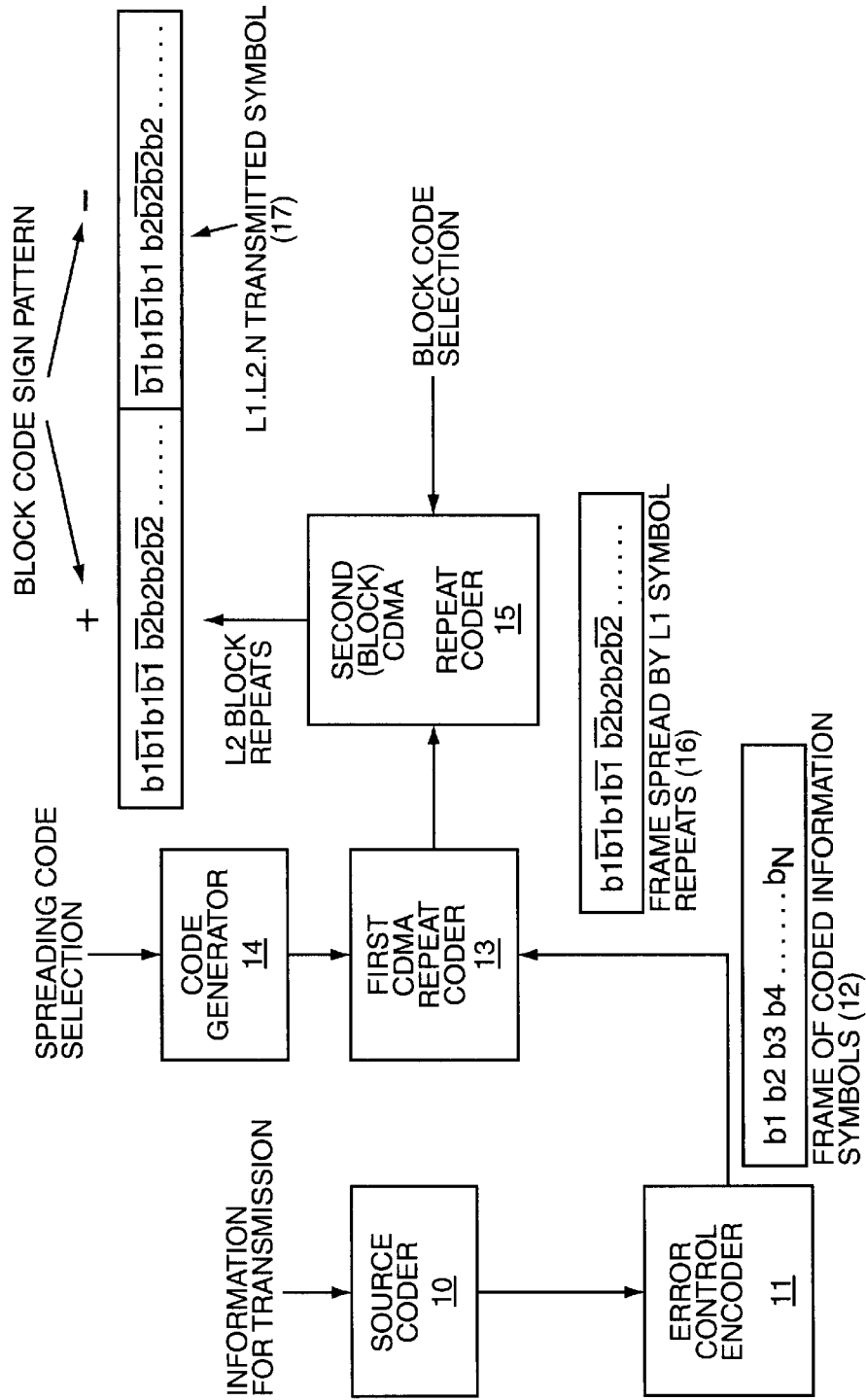
FIG. 1 illustrates a functional block diagram of the CDMA coding scheme according to the present invention.

FIG. 1 illustrates the CDMA coding scheme according to one aspect of the present invention. A source coder (10) converts information for transmission to digital form through the use of, for example, an analog-to-digital converter. An error control coder (11) adds redundancy to the digital data in the form of error correction or error detection bits to allow errors at the receiver to be detected or corrected. The error control coder (11) may include interleaving in order to disperse the redundant bits in time so as to provide better immunity against error bursts. Frames of N coded symbols are then input to a first CDMA coder (13) which repeats each symbol a first number of times L1, according, for example, to conventional CDMA methodology (i.e., repeats of the same symbol occur successively). The placement of repeats of the same symbol adjacent to one another, as in conventional CDMA methods, is, however, only meant to be exemplary and not meant to exclude any other repeat placement strategy.

CDMA coder (13) may systematically alter the sign of repeats of the same symbol using a sign pattern or "access code" provided by code generator (14). For a particular transmission, the code generator will be programmed by a unique code selection indication. CDMA coder (13), together with code generator (14), may implement any conventional CDMA coding technique, such as orthogonal coding, non-orthogonal, pseudo-random coding, or the block-orthogonal coding of the above-identified related application.

The output of CDMA coder (13) is a frame of L1×N symbols, which is illustrated at (16) with the assumption that coder (13) places repeats according to conventional CDMA. The bar over certain repeats indicates those which have been inverted due to a sign change provided by the code generator (14) while repeats without a bar are not inverted.

In the present invention, a second block-orthogonal CDMA coder (15) generates repeats of frame (16), each block-repeat being changed in sign (or phase) according to a block sign or phase sequence selection provided by code generator (14). According to a preferred embodiment, the block-sign or phase sequences used for different transmissions are relatively orthogonal, i.e., they form an orthogonal set. Block-repeater (15) repeats each block a number L2 times, so that the final transmitted frame (17) comprises L1×L2 repeats of the N coded information symbols. Thus, a total of L1×L2×N symbols are transmitted per frame. Each transmitted repeat of a symbol is commonly referred to as a "chip."

Binary orthogonal sequences for modifying the sign of repeated symbol blocks may be constructed by using Walsh-Hadamard codes. There are $2^N$ Walsh-Hadamard codes of length $2^N$ bits. When all Walsh-Hadamard codes are used by a first transmitting station to transmit different information signals to different receivers, an adjacent transmitting station may avoid transmitting exactly the same codes by using a modified Walsh code set, formed by bitwise modulo-2 adding a common masking code to all codes of its set. This will result in the codes from an adjacent transmitting station being different from, but not orthothogonal to, the codes of the first transmitter. One criterion for choosing such masking codes is that the correlation between any code of one set and any code of another set should be equally low, thus avoiding undesired high correlations. Such masking codes are described in U.S. Pat. No. 5,550,809 to Bottomley et al. which is hereby incorporated by reference.

Alternatively, if an orthogonal code set containing other than a power of two codes is selected, then orthogonal Fourier phase sequences may be used, as illustrated in FIG. 2 for the case of L2=3.

When orthogonal phase sequences are used, the phase of transmission of each repeated block is rotated in phase by complex multiplication with exp(j·Phi) where "exp" is a complex exponential function, "j" signifies the square root of (−1) and "Phi" is a phase from a selected phase sequence.

Figure 3:
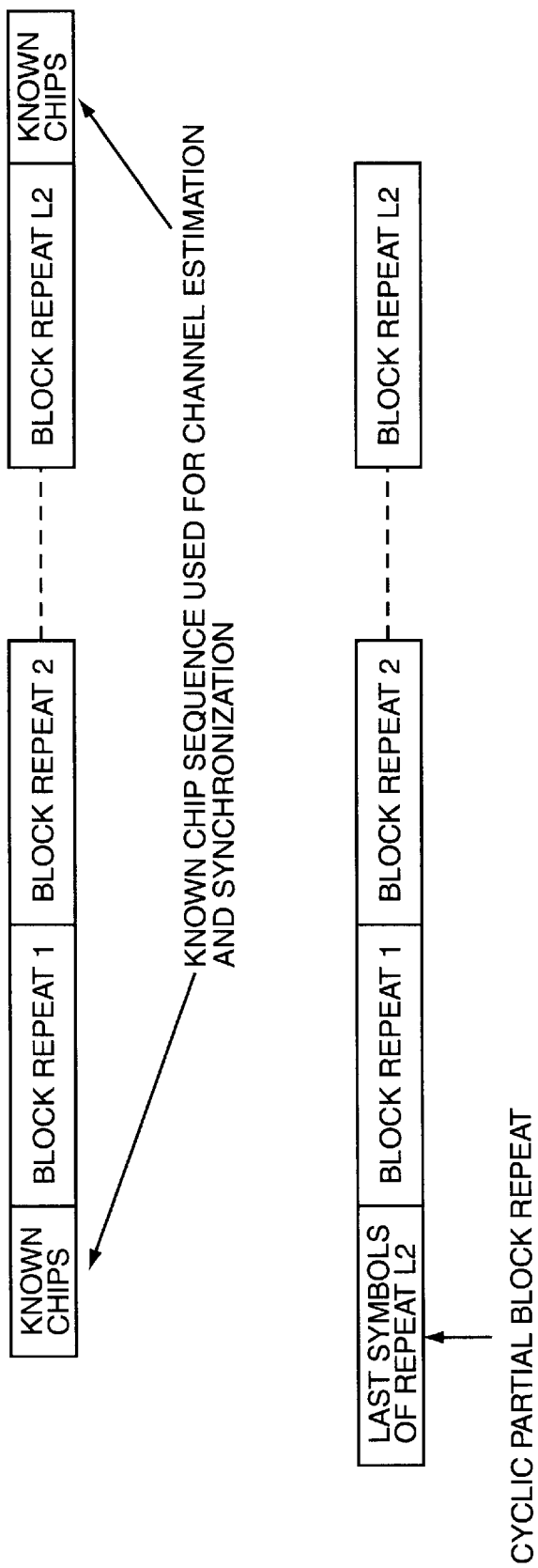
FIG. 3 illustrates the technique of adding known chip sequences or partial block repeats between transmitted frames according to the present invention.

FIG. 3 illustrates the technique of adding known symbols between the transmitted frames. The known symbol or chip sequence is placed between the transmitted frames at regular intervals to allow the receiver to determine, by correlation with the known chip pattern, how many propagation paths of different delays are in effect, and the phase and amplitude of each, as shown in FIG. 4 by C0, C1, C2, etc. for paths delayed by 0 chips, 1 chip, 2 chips, etc.

FIG. 3 also shows that a partial block repeat of the last block repeat may be appended up front so that the frame appears to be part of a cyclically repeating sequence of L2 block repeats. The number of chips forming the cyclic guard repeat should be equal to the longest expected multipath delay of significance (i.e., received at significant signal strength). The cyclic partial block repeat may be used as well as interspersing known symbols between frames.

Figure 4:
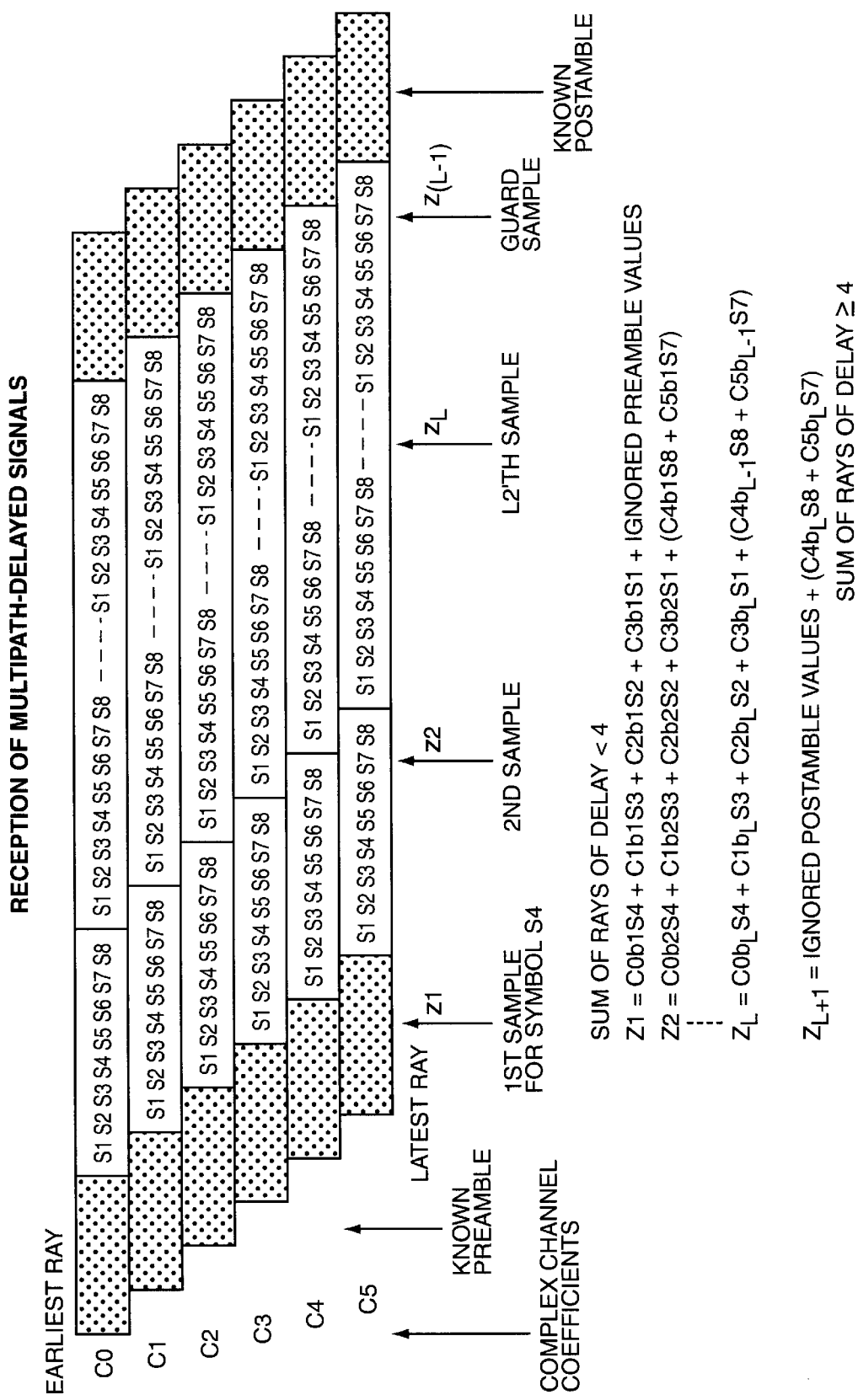
FIG. 4 illustrates the reception of multipath-delayed signals according to the present invention.

FIG. 4 illustrates the reception of a transmitted frame with several multipath echos delayed by 1, 2, 3, 4 and 5 chip periods, respectively, and the reception of amplitude and phase provided by the complex channel coefficients C0, C1, C2, ..., C5. A receiver, according to the present invention, performs CDMA despreading by first combining the L2 block repeats to compress the received frame of samples by a factor L2. The L1 symbol repeats, inserted by first CDMA encoder (13), are then combined to further compress the number of samples by a factor of L1.

The doubly compressed frame of now N samples (plus tail samples arising from multipath) is then decoded in order to equalize any remaining multipath effects and error correction and detection.

FIG. 4 shows the extraction of samples Z1, Z2, ..., $Z_L$, $Z_{(L+1)}$ corresponding to symbol position S4 in the earliest multipath ray. FIG. 4 also gives the equations for the samples showing the influence of the block signs b1, b2, ..., $b_L$. The receiver combines the samples by adding, after removing the block signs, to obtain b1Z1+b2Z2+b3Z3+ ... +$b_L Z_L$=L (C0S(i)+C1S(i−1)+ ... +C4S(i−4)+C5S(i−5)) when i>5, and for i<6 there is an additional term of (b1b2+b2b3+b3b4+ ... +$b_{L-1}b_L$) (C0S(N+i)+C1S(N+i−1)+ ... +C5S(N+i−5))

the strength of which is determined by the correlation of the block-sign code b1, b2, b3, etc. with a one-place shift of itself. The latter term represents the remaining departure from true orthogonality when practicing this form of the invention, as the one-place shifted code will also have a non-zero correlation with the codes used for transmitting other signals. Some of this residual interference may be removed by adding or subtracting sample $nZ_{L+1}$ to the other samples to cancel the rays of delay greater than the symbol index. The residual interference mentioned above occurs only with symbols spaced less than the maximum multipath delay from the start of the block, and is of a strength determined by the correlation of a code with itself shifted one place. This is an improvement over conventional systems in which all symbols suffer from non-orthogonal interference under multipath conditions, and the strength of the interference depends on code correlations with all shifts of itself.

A case of particular interest occurs when L2=2. There is only one choice for a two-bit orthogonal code set, i.e., the code set 00 (or ++) and 01 (or +−). No masking code can be added to the two 2-bit codes that will produce a different set, since inverses are considered the same set. Thus, it is possible to allocate the code ++ and the code +− to different signals within a first and a second service area.

For example, the block-repeat signs ++ can be allocated to the strongest half of the signals transmitted in a first service area, that is, to signals destined for distant receivers out to the edge of the service area. The code +− is allocated for transmissions to the nearby receivers, i.e., out to a service area equal to the maximum radius divided by root(2). In a neighboring service area, the usage of the codes ++ and +− is reversed. There, the code +− is used for receivers distant from their respective transmitter in the adjacent service area and the code ++ is used for nearby receivers. The division of adjacent service areas into concentric rings using the two block-repeat sign patterns ++ and +− is illustrated in FIG. 5.

A transmitter located at B1 serves a first service area, using block repeat sign pattern ++ out to 1/root(2) or 71% of the maximum radius, to communicate with a mobile station m3. The transmitter at B1 uses code +− to communicate with mobile stations, such as m2, located beyond the first service area out to the maximum radius Rmax.

Simultaneously, a transmitter in an adjacent service area centered on B2 communicates out to maximum range (e.g., to mobile m1) using code ++ and out to 71% of the maximum range (e.g., to mobile m4) using code +−. The base stations located at B1 and B2 can be synchronized to a common time standard, such as GPS. But, due to multipath and different propagation delays to the receiver, signals from the two stations received at the same receiver will suffer some time misalignment. The block-spreading technique of the present invention substantially preserves orthogonality between signals with delays up to a fraction of the block length.

Figure 5:
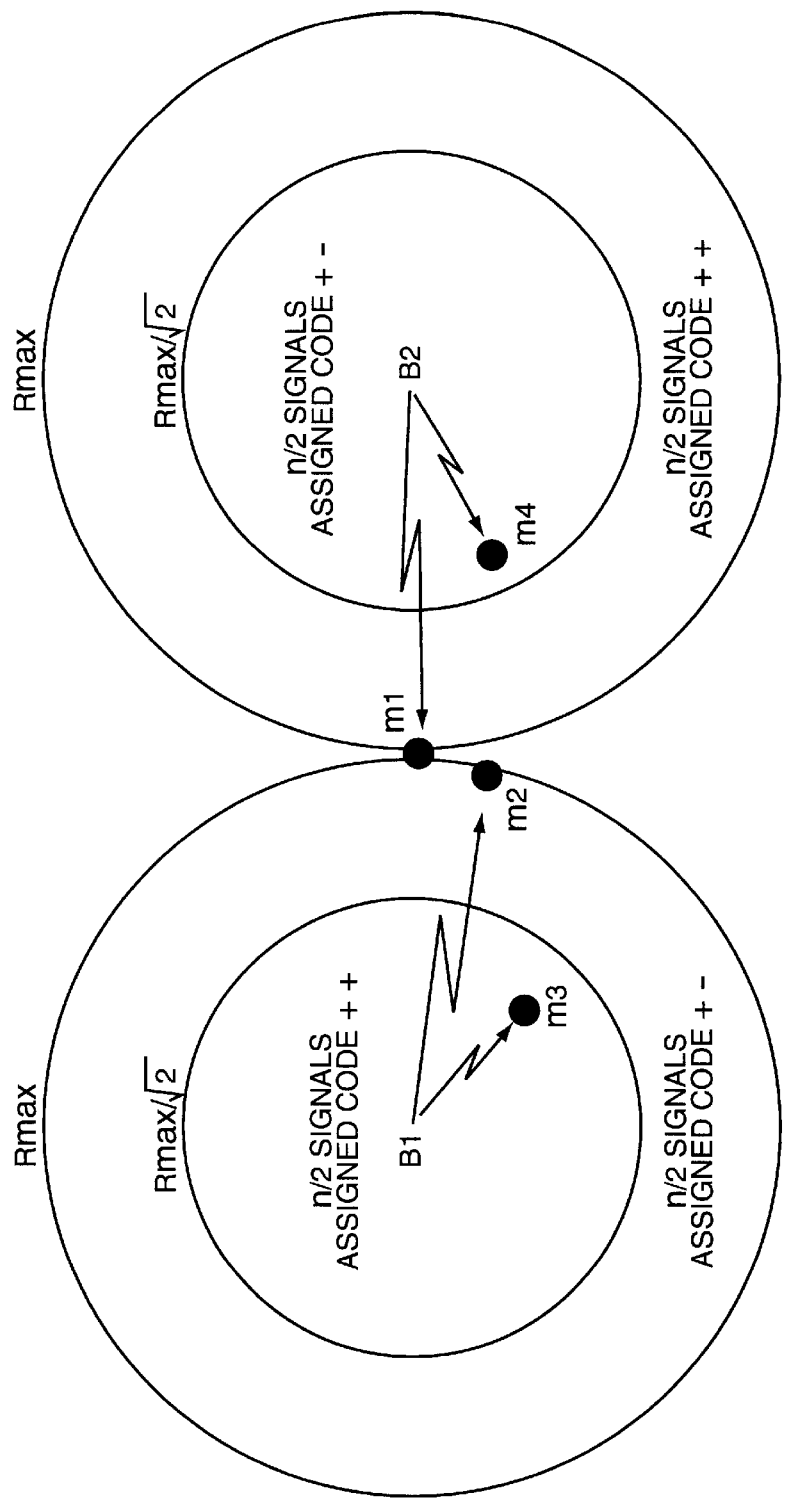
FIG. 5 illustrates code re-use partitioning of adjacent service areas according to one aspect of the present invention.

The use of the inventive block-repeat CDMA coding with orthogonal block-sign codes ++ and +−, assigned as shown in FIG. 5, minimizes the interference of the high power transmission from B1 to m2 with the reception at m1 or m3, while also minimizing the interference of the high power transmission from B2 to m1 with the reception at m2 or m4. Interference between the transmission from B2 to m1 and the transmission from B1 to m3 (which use the same code ++) is much less problematic since m3 is significantly further from B2 than it is from B1. The distance ratio is (2root(2)−1):1 or 1.828:1, which, using a typical landmobile radio 4th power of distance, means that interference from B2 to m3 is approximately 10 dB less significant than interference from B1 to m3. Thus, assigning the codes to cancel strong own-cell interference rather than adjacent cell interference allows for a significant reduction in the power used for communicating from B1 to m3 and from B2 to m1. This also reduces the interference of the B1–m3 transmission with the reception at m1, and the interference of the B1–m4 transmission with the reception at m2. All links therefore suffer reduced interference by practicing code re-use partitioning according to the present invention. Such a technique would have been ineffective in conventional systems without the benefit of the present invention to substantially preserve orthogonality between signals even when transmitted from different base stations.

Figure 6:
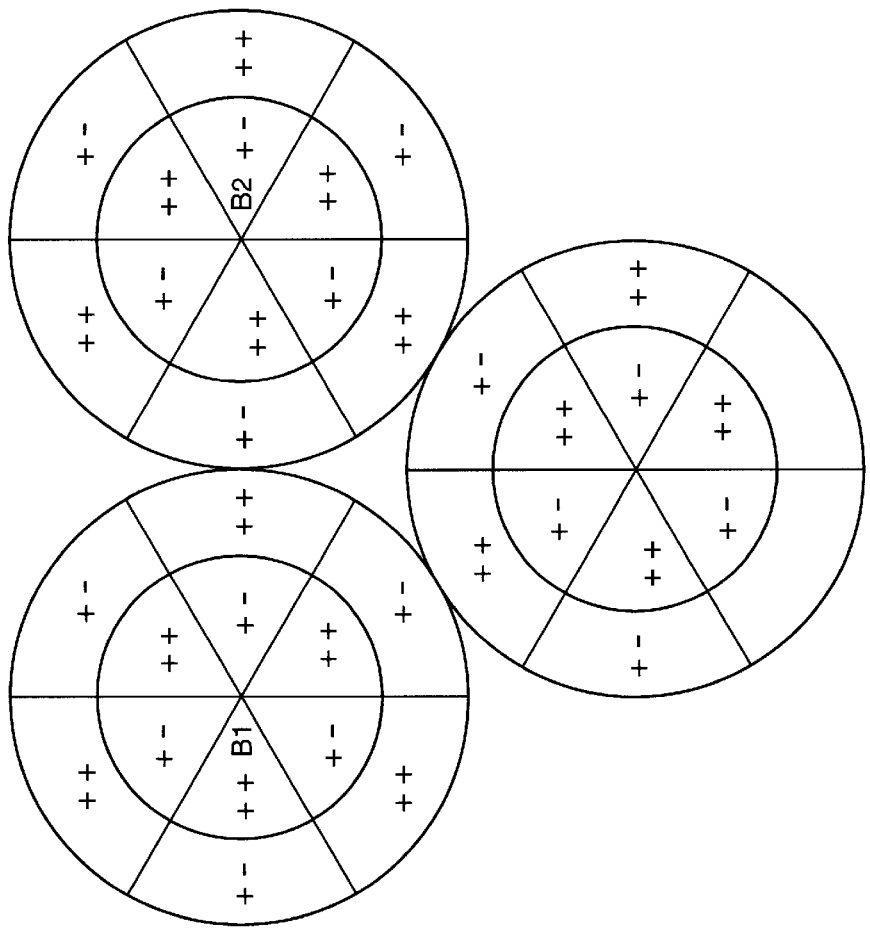
FIG. 6 illustrates code re-use partitioning of sectorized, adjacent service areas according to one aspect of the present invention.

FIG. 6 shows code re-use partitioning using the two codes ++ and +− in a sectorized system, in which directional antennas divide the service area into 6 sectors. The two codes denoted by ++ and +− are shown assigned cyclically around the 6 sectors in each concentric ring such that adjacent sectors do not use the same code. The code assignment is rotated in concentric rings of different radius such that the same code is not used twice in the same angular sector. The code assignment to different base stations also ensures that facing sectors of two adjacent bases do not use the same code out to maximum range.

Figure 7:
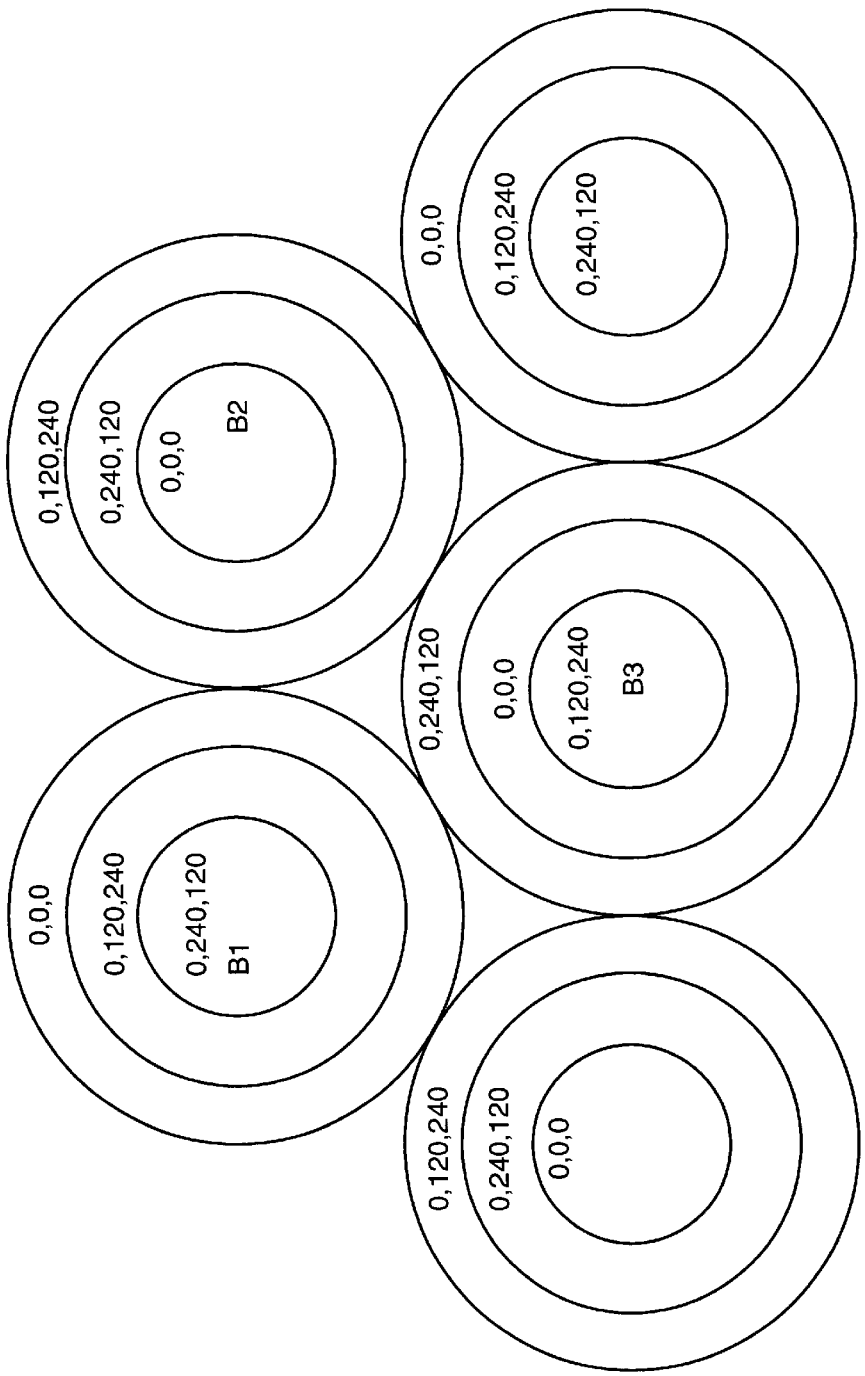
FIG. 7 illustrates a 3-cell re-use pattern using phase codes according to one aspect of the present invention.

FIG. 7 shows a 3-cell code re-use plan using the three Fourier codes (phase codes) of FIG. 2. Three-block repetition is used as the last stage of spreading by a factor L2=3, with a systematic phase rotation applied to successive block repeats through the number of degrees shown. Thus, adjacent cells do not use the same phase code out to maximum range. FIG. 7 also shows the simultaneous use of re-use partitioning where each cell is divided into three concentric regions of nominal radius Rmax, root(⅔)·Rmax and root(⅓)·Rmax. This ensures that the three concentric regions will be of equal area and thus contain equal numbers of receivers or mobile stations, assuming a uniform area of distribution of mobile stations.

Re-use partitioning may be used with or without a 3-cell re-use pattern. When re-use partitioning is used, rings of different radius are assigned different codes. Combining re-use partitioning with the 3-cell re-use pattern results in stations at the maximum radius in one cell only being interfered with by signals transmitted to stations at a minimum radius in half the adjacent cells and by signals transmitted to the intermediate radius in the other half of the adjacent cells.

Figure 8:
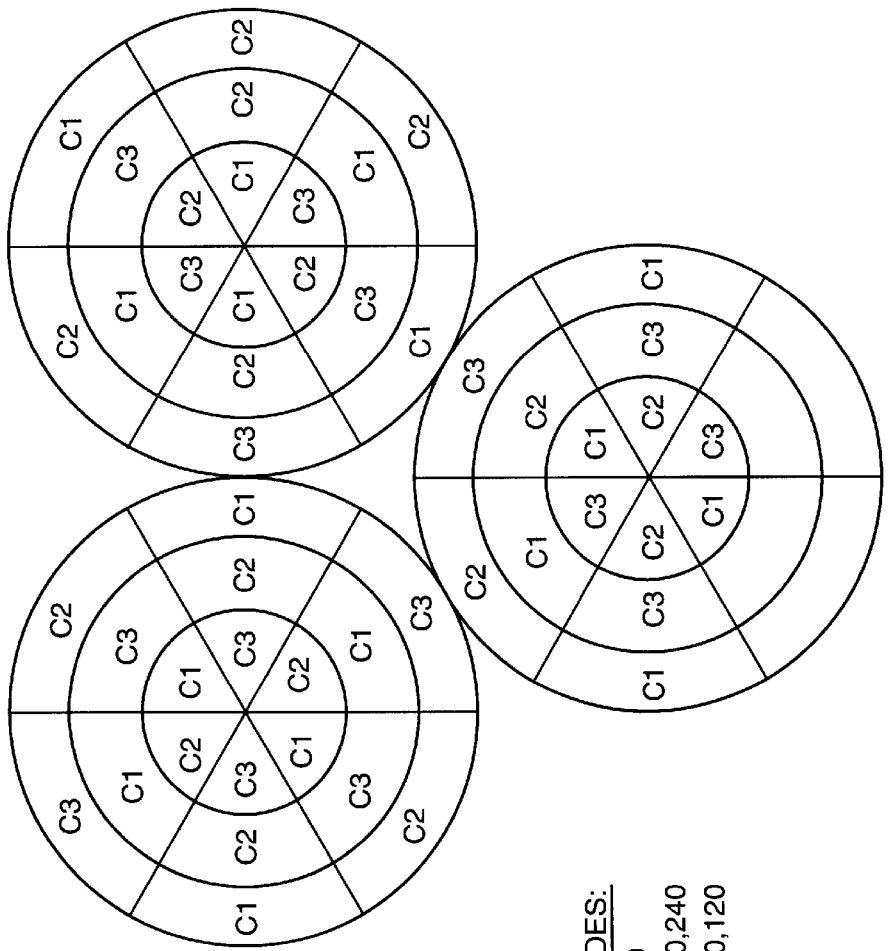
FIG. 8 illustrates a 6-sector, 3-cell re-use pattern using phase codes according to one aspect of the present invention.

FIG. 8 illustrates an assignment of three phase codes to 6 sectors and three concentric rings in a three-cell pattern which attempts to minimize interference between abutting areas. As is evident from FIG. 8, the phase codes are assigned so that abutting areas have different phase codes.

Figure 9:
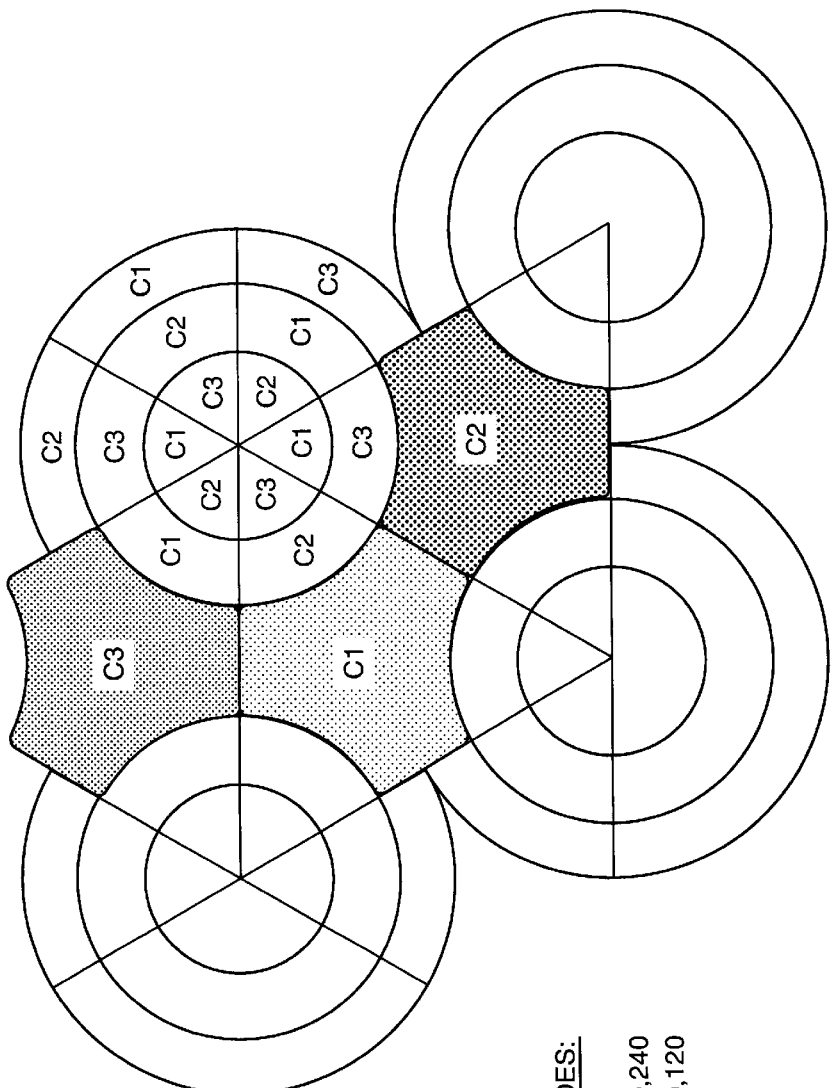
FIG. 9 illustrates a 6-sector, 3-cell re-use pattern having common codes in macrodiversity regions according to one aspect of the present invention.

FIG. 9 illustrates an alternative sector orientation such that three adjacent base station sectors share the common area midway between the three service regions. A code assignment can then be made so that the three base stations use the same code in the common area (represented by common areas C1, C2 and C3 in FIG. 9), allowing a mobile receiver using the common code to be serviced by any one, two or three of the base stations.

When signals are transmitted using the same code from more than one base station to a receiver, the receiver treats the additional signals as delayed multipath and combines them constructively to obtain diversity gain and improved communication performance. This technique, useful for communicating to mobile stations in a border zone, is termed "macrodiversity." Macrodiversity can also be used in the 6-sector, 3-cell re-use pattern illustrated in FIG. 8, when different codes are transmitted to the same point from adjacent base stations. However, the receiver must then be informed to decode both codes and to combine the results. The advantage of macrodiversity according to FIG. 9 is that the receiver need not change its operation when a macrodiversity transmission is activated.

Figure 10:
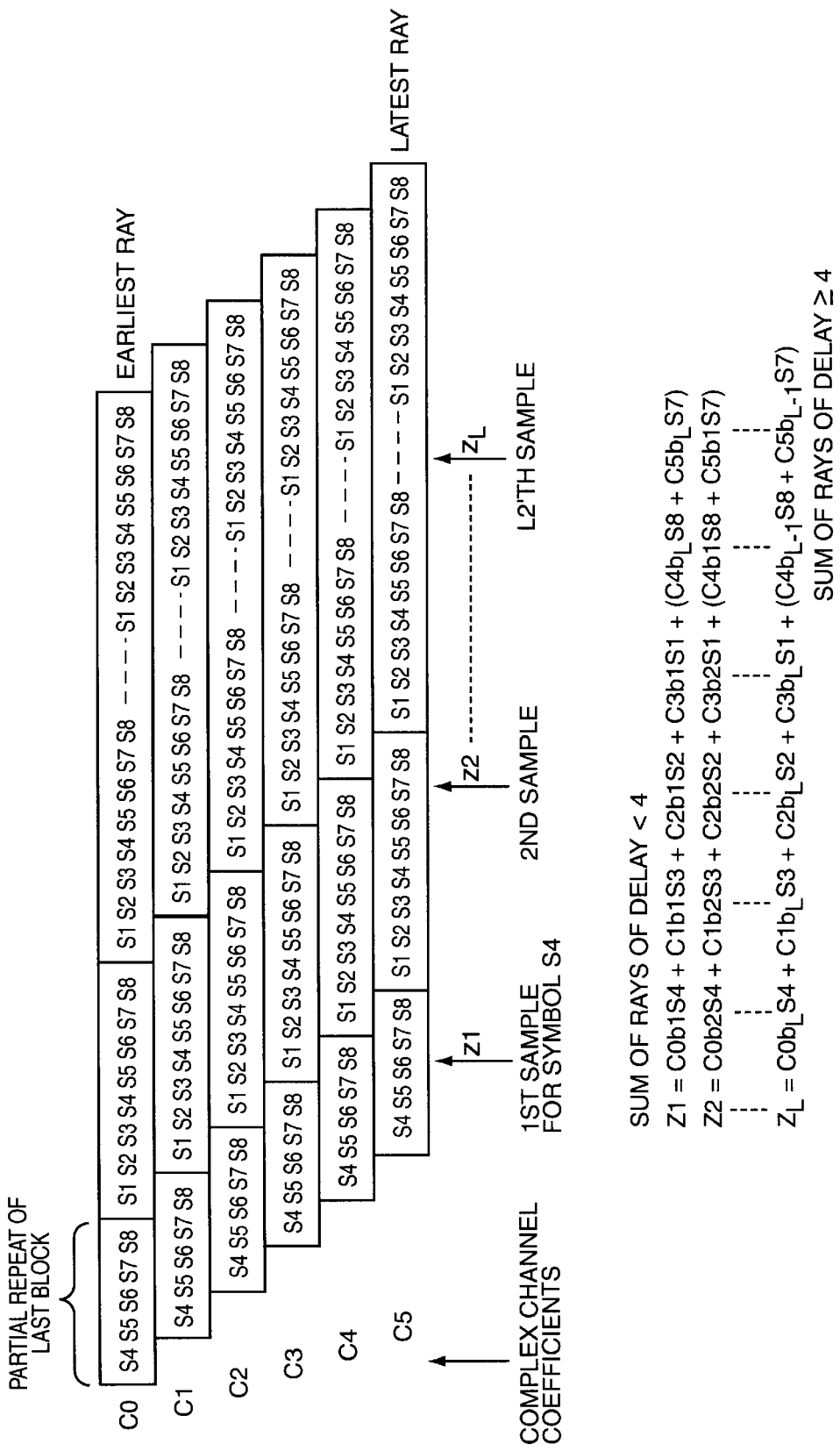
FIG. 10 illustrates the reception of a frame transmitted using a cyclic guard repeat, after the signal has propagated through multiple delayed paths according to the present invention.

When Fourier (phase) codes are used, the use of cyclic partial block repeats at the beginning (or end) of the transmitted frame, as depicted in FIG. 3, is especially interesting. FIG. 10 illustrates the reception of a frame transmitted using a cyclic guard repeat, after the signal has propagated through multiple delayed paths. The signal is decoded by combining corresponding samples spaced by the repeat-block length. The equations which represent the dependence of the L2 samples on the transmitted symbols S(i), the block-repeat codes or phase-rotation factors $b_1, b_2, \ldots, b_L$ and the channel coefficients $C_0, C_1, C_2, \ldots, C_5$ are set forth in FIG. 10.

As is evident from the equations, the samples $Z_1, \ldots, Z_L$ depend on a first and second group of symbols. The first group of symbols, termed "the early rays," represent those multipath echos having a delay less than the distance that the symbol being sampled lies into the block. The second group of symbols termed "the late rays," represent those rays delayed by more than the sample index. The early rays are phase-rotated, for successive Z-samples, by the phase factors $b_1, b_2, b_3, \ldots, b_L$ while the late rays are rotated between successive Z-samples by the rotated phase sequence $b_L, b_1, b_2, \ldots, b_{L-1}$. The samples are combined by multiplying them by the complex conjugates of the phase sequence values, that is by $$b_1^*, b_2^*, b_3^*, \ldots, b_L^*$$

and then adding the results. Multiplication by the complex conjugate values derotates the phases of the blocks so that they align with each other and therefore add coherently. It should be noted, however, that the "late rays" will be multiplied by a conjugate sequence that is rotated one place relative to the phase values of the late rays. The characteristic of the Fourier sequences, however, is that a rotation of the sequence produces the same sequence with a phase rotation. That is, the sequences $$\exp(j\cdot 0), \exp(j\cdot Phi), \exp(J\cdot 2Phi), \exp(j\cdot 3Phi), \ldots, \exp(j\cdot(L-1)Phi)$$

and $$\exp(j\cdot(L-1)Phi), \exp(j\cdot 0), \exp(j\cdot Phi), \exp(j\cdot 2Phi), \ldots, \exp(j\cdot(L-2)Phi)$$

are the same sequence, just with a factor of $\exp(-j\cdot Phi)$ applied to every value of the first sequence to obtain the second, shifted sequence.

Thus, combining the samples using the conjugate phase sequence values gives the following result:

$$b1*Z1 + b2*Z2 + \ldots + b_L*Z_L =$$
$$L((C0 \cdot S4 + C1 \cdot S3 + C2 \cdot S2 + C3 \cdot S1) +$$
$$\text{early rays}$$
$$(C4 \cdot S8 + C5 \cdot S7) \cdot \exp(-j \cdot Phi)).$$
$$\text{late rays}$$

The conjugate phase sequence is orthogonal to all interfering signals that were constructed using a different phase sequence, including time-rotated versions thereof, so only wanted signals and their multipath energy survive in the above result. This also occurs when the value of L2 is 2, since the 2-bit Walsh codes ++ and +− are equivalent to length 2 Fourier sequences (phases 0,0 and 0,180).

Omitting the factor L, which is only a scaling factor, the following result is obtained after processing of the block-spaced samples of the received signal taken with different starting positions:

```
Co.S1 + α (C1.S8 + C2.S7 + C3.S6 + C4.S5 + C5.S4)         = U1
Co.S2 + C1.S1 + α (C2.S8 + C3.S7 + C4.S6 + C5.S5)         = U2
Co.S3 + C1.S2 + C2.S1 + α (C3.S8 + C4.S7 + C5.S6)         = U3
Co.S4 + C1.S3 + C2.S2 + C3.S1 + α (C4.S8 + C5.S7)         = U4
Co.S5 + C1.S4 + C2.S3 + C3.S2 + C4.S1 + α C5.S8           = U5
Co.S6 + C1.S5 + C2.S4 + C3.S3 + C4.S2 + C5.S1             = U6
  .       .       .       .       .       .
  .       .       .       .       .       .
  .       .       .       .       .       .
Co.S + C1.S  + C2.S  + C3.S  + C4.S  + C5.S               = U
    L     L-1     L-2     L-3     L-4     L-5                L
```

Processing these despread samples U1, U2, U3, etc. in order to resolve symbols S1, S2, S3, etc. is a classic equalizer problem for demodulating a signal that has been received through a multipath channel. A small variation from the classical equalizer is the absence of starting and ending "tails," where the earlier values depend only on the earliest received rays and the last few values depend only on the rays with greatest delay. Instead, the use of the partial block repeat of the last block at the beginning of the frame has resulted in a "tail-biting" version of the classic equalizer problem.

The values S1, S2, S3, etc. represent information symbols destined for a single receiver when no further despreading is needed, i.e., the first CDMA spreading factor L1 equals 1. Otherwise, the value of S represents the sum of a number of different transmitted information streams, which are discriminated from one another by using the factor L1 in a second despreading operation. Nevertheless, the inventive block-despreading scheme reduces the number of signals contained in the values S that remain to be discriminated by the factor L2. Only a fraction 1/L2 of the originally transmitted signals remain, while the others are canceled. By smart assignment of codes or phase sequences to cells and distance of transmission within the cell, it can be arranged that the fraction 1/L2 of signals remaining to be discriminated are of a similar signal strength order, thus avoiding the problem of discriminating a weak signal from a much stronger signal. The transmission power can therefore be better adapted to the desired range of transmission, without problems arising due to too great a disparity between strong and weak signals.

The first stage of spreading by a factor L1 in the transmitter block diagram of FIG. 1 must be matched by a second stage of despreading in the receiver. The spreading by a factor L1 can be accomplished by any of the following types of CDMA:

(i) Conventional, i.e. non-block-interleaved, non-orthogonal CDMA (repeat coding);

(ii) Conventional, orthogonal CDMA;

(iii) Block-interleaved CDMA according to the invention of the related application using binary codes; or (iv) Block interleaved CDMA according to the invention of the related application using Fourier sequences.

An example of type (i) or (ii) is set forth below.

When conventional, non-interleaved CDMA is used, repeats of a symbol follow one another. That is, successive values S1, S2, S3, . . . , $S_L$ carry the same information, apart from a sign change according to the spreading code. Repeats are combined by multiplying the samples U1, U2, U3, etc. with a copy of the spreading code used to remove their sign differences, and then adding the results. While the wanted signal accumulates by the number of repeats L1 combined with the correct signs, unwanted signals do not accumulate. Thus the despreading process enhances the ratio of wanted signals to unwanted signals. When orthogonal CDMA signals are used, unwanted signals with a propagation delay equal to that of the ray of the wanted signal being accumulated cancel out.

In conventional CDMA, delayed rays appear to be non-orthogonal and are suppressed relative to an undelayed ray. To extract the useful energy in a delayed multipath ray, the samples U2, U3, etc. may be accumulated using the spreading code shifted one place in order to align the sign pattern with a one-chip delayed ray. Correlating successive shifts of the samples U with the spreading code thus successively extracts energy in the delayed rays of amplitudes C0, C1, C2, etc., as shown in the example below assuming that L1=4 so that four successive U values are combined. The shifts of the samples U that are chosen to be combined using the spreading code are called "RAKE taps" and this form of receiver is called a RAKE receiver. In the example below, all shifts are shown as being correlated, however, if any of the C0, C1, C2, etc. channel values are negligible, then RAKE tap and correlation may be omitted.

```
Co.S1 + α (C1.S8 + C2.S7 + C3.S6 + C4.S5 + C5.S4)         = U1
Co.S2 + C1.S1 + α (C2.S8 + C3.S7 + C4.S6 + C5.S5)         = U2
Co.S3 + C1.S2 + C2.S1 + α (C3.S8 + C4.S7 + C5.S6)         = U3
Co.S4 + C1.S3 + C2.S2 + C3.S1 + α (C4.S8 + C5.S7)         = U4
Co.S5 + C1.S4 + C2.S3 + C3.S2 + C4.S1 + α C5.S8           = U5
Co.S6 + C1.S5 + C2.S4 + C3.S3 + C4.S2 + C5.S1             = U6
  .       .       .       .       .       .
  .       .       .       .       .       .
  .       .       .       .       .       .
Co.S + C1.S  + C2.S  + C3.S  + C4.S  + C5.S               = U
    L     L-1     L-2     L-3     L-4     L-5                L
```

After performing the above combinations of four successive U-values, with sign changes given by the wanted signal's spreading code, the following values are obtained:

$$U1(0)=4C0\cdot S1,\ U1(1)=4C1\cdot S1,\ U1(2)=4C2\cdot S1,\ U1(3)=4C3\cdot S1,\ U1(4)=4C4\cdot S1,\ U1(5)=4C5\cdot S1.$$

These values represent the same information S1, carried by different multipath rays of amplitudes C0, C1, C2, ..., C5. Finally, a RAKE receiver forms a weighted sum $$C0^*U1(0)+C1^*U1(1)+C2^*U1(2)+C3^*U1(3)+C4^*U1(4)+C5^*U1(5)$$

using the conjugates of the channel coefficients C0, C1, ..., C5 as weights. The result is a "soft" value for the information symbol S1. Similar soft values are obtained for S2, S3, etc. These soft values are then transferred to an error control decoder which is adapted to undo the coding applied by the error control coder (11) of FIG. 1.

Thus, it has been shown that a conventional CDMA spreading method that partially spreads the signals by a first factor L1 can be followed by the block-repeat method described in the related application in order to further spread the signals by a factor L2, thus achieving a total spectral spreading factor of L1×L2.

The inventive receiver first performs a block-despreading operation that compresses the number of signal samples by the factor L2, the number of block-repeats used, to thereby eliminate all but a fraction 1/L2 of the interfering signals. The remaining signals are discriminated by using, for example, a conventional RAKE receiver to further process the compressed sample block and to complete despreading by the remaining factor L1, thus decoding a single signal.

As set forth above, the use of Fourier phase sequences, together with a partial extra block-repeat of a length equal to the longest expected multipath delay, forms a cyclic pattern of block repeats that is advantageous in eliminating delayed multipath rays of the unwanted signals.

It has also been shown how the block-spreading sequences, whether they are Walsh or Fourier sequences, can be intelligently assigned to groups of signals in various adjacent service areas or according to transmitter-receiver distance such that strong signals are better discriminated from weak signals and inter-cell interference is reduced.

While the above discussion has concentrated on communications from a fixed base station to mobile stations, the technique is equally applicable for communications arising from the mobile station to a base station because the block-spreading technique provides orthogonality between signals that is insensitive to different delays from mobiles at different distances to the base station. Gross delay differences may be removed by the base station by commanding each mobile to adjust its transmit timing so that all signals are received at the base station with a desired time-alignment accuracy. In this way, the advantages of reduced interference between and within cells may also be obtained for communications from a mobile to a base station.

Many variants and combinations of the techniques taught above may be devised by a person skilled in the art without departing from the spirit or scope of the invention as described by the following claims.

I claim:

1. A method for communicating information between a first station and a number of second stations located in a communications service area, comprising the steps of:
    converting information to digital symbols for transmission;
    repeating each of said symbols a first number of times;
    altering a sign of select repeated symbols using a first access code sequence;
    assembling a number of symbols repeated said first number of times into blocks of repeated symbols; and
    repeatedly transmitting each of said blocks of symbols a second number of times, using a block sign or phase change determined by the digits of a second access code sequence.

2. The method of claim 1 wherein said converting step comprises analog-to-digital conversion.

3. The method of claim 1 wherein said converting step comprises error correction or detection coding.

4. The method of claim 3 wherein said error correction coding is Reed-Solomon block coding.

5. The method of claim 3 wherein said error correction coding is convolutional coding.

6. The method of claim 1 wherein said converting step comprises error correction coding combined with interleaving.

7. The method of claim 1 wherein said first access code sequence is one of a number of orthogonal code sequences assigned to transmit different information signals.

8. The method of claim 1 wherein said first access code sequence is one of a set of Walsh Hadamard codes bitwise combined with a masking code sequence assigned for use in a given service area.

9. The method of claim 1 wherein said second number of times is two, and said block sign sequence is either ++ and +− or +− and ++.

10. The method of claim 1 wherein said block phase changes from one of a number of orthogonal Fourier sequences.

11. The method of claim 1 wherein said step of repeatedly transmitting blocks of symbols includes modulating a radio frequency carrier using said symbols.

12. The method of claim 1 wherein said second access code sequence is varied between adjacent service areas in order to reduce interference from transmissions in one service area to communications in an adjacent service area.

13. The method of claim 1 wherein said second access code sequence is assigned for communication with a particular second station based on the distance between said first station and the particular second station.

14. The method of claim 1 wherein a known sequence of symbols is transmitted before a first block repeat of said repeated block transmissions.

15. The method of claim 1 wherein a known sequence of symbols is transmitted after a last block repeat of said repeated block transmissions.

16. The method of claim 1 wherein a known sequence of symbols is transmitted before a first block repeat and after a last block repeat of said repeated block transmissions.

17. The method of claim 16 wherein said known sequence of symbols is of duration at least equal to a delay difference between an earliest expected multipath ray and a latest expected multipath ray.

18. The method of claim 1 wherein a number of the symbols from an end of a last repeated block are appended for transmission just before a first block repeat.

19. The method of claim 18 wherein said number of symbols is selected to have a transmission duration equal to a delay difference between an earliest expected multipath ray and a latest expected multipath ray.

20. The method of claim 1 wherein a number of the symbols from a start of a first block repeat are transmitted again following a last block repeat.

21. The method of claim 20 wherein said number of symbols is selected to have a transmission duration equal to a delay difference between an earliest expected multipath ray and a latest expected multipath ray.

22. The method of claim 1 wherein said step of repeatedly transmitting blocks of symbols includes forming a complex modulating waveform corresponding to said symbols and adding, through the use of weighting factors, a number of complex modulating waveforms corresponding to different information signals to be transmitted using different ones of said first or second access code sequences.

23. The method of claim 22 wherein said weighting factors are varied to adjust a relative power of transmission of information to different ones of said second stations.

24. A method for communicating information between a first station and a number of second stations located in a communication service area, comprising the steps of:

converting a received signal to a representative stream of complex numerical samples;

assembling said complex numerical samples into a frame corresponding to a given number of repeatedly transmitted symbol blocks;

combining corresponding samples from different block-repeats within said frame by removing the sign or phase difference between block-repeats according to a second access code sequence and then adding to obtain a first compressed frame of samples; and further combining samples from said first compressed frame of samples using a first access code sequence to obtain a doubly compressed frame of samples; and processing said doubly compressed frame of samples using an error correction decoder to reproduce said information.

25. The method of claim 24 wherein said further combining of samples is performed by a RAKE receiver algorithm.

26. A transmitter for transmitting digital symbols from a first station to a plurality of second stations in a Code Division Multiple Access (CDMA) environment, said transmitter comprising:

a first CDMA repeat coder for repeating each digital symbol to be transmitted a first number of times and for altering a sign of select repeated symbols in accordance to a first access code sequence; and a second CDMA repeat coder for assembling a number of symbols repeated said first number of times into blocks of repeated symbols, for repeating each block a second number of times, and for altering a sign or phase of select repeated blocks in accordance to a second access code sequence.

27. The transmitter according to claim 26 wherein said first access code sequence is one of a number of orthogonal code sequences assigned to transmit different information signals.

28. The transmitter according to claim 26 wherein said first access code sequence is one of a set of Walsh Hadamard codes bitwise combined with a masking code sequence assigned for use in a given service area.

29. The transmitter according to claim 26 wherein said second number of times is two, and said block sign sequence is either ++ and +− or +− and ++.

30. The transmitter according to claim 26 wherein said block phase changes from one of a number of orthogonal Fourier sequences.

31. The transmitter according to claim 26 wherein said second access code sequence is varied between adjacent service areas in order to reduce interference from transmissions in one service area to communications in an adjacent service area.

32. The transmitter according to claim 26 wherein said second access code sequence is assigned for communication with a particular second station based on the distance between said first station and the particular second station.

* * * * *